Jan. 5, 1960 R. F. J. FILIPOWSKY 2,920,143

REDUNDANCY REDUCING PULSE COMMUNICATIONS SYSTEM

Filed May 16, 1956 3 Sheets-Sheet 1

INVENTOR.

Richard Friedrich Josef Filipowsky,

BY

Wenderoth, Lind & Ponack

ATTYS.

REDUNDANCY REDUCING PULSE COMMUNICATIONS SYSTEM

Filed May 16, 1956 3 Sheets-Sheet 2

INVENTOR.
Richard Friedrich Josef Filipowsky,
BY
Wenderoth, Lind & Ponack
ATTYS.

REDUNDANCY REDUCING PULSE COMMUNICATIONS SYSTEM

Filed May 16, 1956 3 Sheets-Sheet 3

INVENTOR.
Richard Friedrich Josef Filipowsky
BY
Wenderoth, Lind & Ponack
ATTYS.

United States Patent Office 2,920,143

Patented Jan. 5, 1960

2,920,143

REDUNDANCY REDUCING PULSE COMMUNICATIONS SYSTEM

Richard Friedrich Josef Filipowsky, Glen Burnie, Md., assignor to Companhia Portuguesa Radio Marconi, S.A.R.L., Lisbon, Portugal, a Portuguese corporation Application May 16, 1956, Serial No. 585,208

Claims priority, application Portugal June 20, 1955

9 Claims. (Cl. 179—15)

The present invention relates to an electric multichannel pulse communication system with redundancy reducing characteristics.

In my U.S. Patent No. 2,676,202 granted April 20, 1954, methods are devised whereby multichannel communication systems can be improved to match the actually used channel capacity to the instantaneous requirement of the individual channels for transmission capacity. Considerable savings in overall transmission capacity can be achieved by employing these principles of "asynchronous complexity dependent time division." It can be seen from the above mentioned patent that the system attaches to each individual sample of every channel a channel mark to allow the identification of this sample at the receiver. By this principle of individual marking of every sample it is possible to abandon the cyclic sampling sequence of all the channels. It is for example possible to interrupt the sampling completely, whenever a channel is idle, even for a few milliseconds. Immediately when the channel becomes busy again, new samples will be produced and by their channel marks it is easy for the receiver to identify them among the many samples arriving at the receiver input, regardless at which instant and after what other samples they arrive.

The system referred to above is highly useful, whenever the individual channels require rather rarely their highest possible sampling frequency, i.e. whenever they have a small amount of energy concentrated in the highest frequencies.

It also operates very efficiently, whenever the individual channels are connected to information sources, whose information flux can become immediately active after idle periods without tolerating appreciable delay over the transmission circuit. Such conditions are regularly met in telephonic conversations.

The present invention offers the possibility to extend the advantages of the above mentioned system also to cases, where the information sources require over longer periods rather high sampling rates and are idle over other periods. It is evident that in such cases the above mentioned system is losing efficiency due to the need to attach channel marks to each sample, even if the sampling frequency is rather high. Over periods of high complexity of the information flux the required transmission capacity becomes then higher than in conventional synchronous time-division systems. Such conditions, which are unfavorable to the above mentioned system, but are favorable to the present system, will be met in certain telemetering and servo systems, but also in most picture transmission systems and in transmission circuits for music.

The fundamental idea underlying the present invention is the subdivision of the total transmission range into several subranges, which contain individual transmission channels in time-division. The subranges themselves may be multiplexed by time-division or frequency division and all channels of one particular subrange should have the same channel capacity (band-width), but channels belonging to other subranges should have considerably different channel capacity.

According to the present invention, we have to distinguish between input channels connected to information sources and transmission channels carrying the information from one terminal to another over a transmission medium, whereby automatic switching means should connect for rather short intervals any input channel to this and only this transmission channel whose transmission capacity is closest to the maximum information flux of the given input channel over this short time interval.

To give an example, it may be assumed that a transmission link offers a total band width of 1 mc./s., which is further divided by frequency division into 5 ranges of bandwidth respectively 200 kc./s., 100 kc./s., 50 kc./s., 25 kc./s. and 400 kc./s., the remaining band-width being used for transition ranges of the channel separating filters. Subrange 1 to 4 may contain each 30 channels in time-division. If pulse amplitude modulation is employed the first subrange may operate in synchronous time-division with 8 kc./s. pulse repetition frequency, still allowing a certain channel capacity for a synchronisation signal and for some safety margin between pulses to avoid interchannel cross-talk. The second subrange may also accommodate 30 channels in synchronous time-division, allowing only 4 kc./s. pulse repetition frequency. Also the third and the fourth subrange may each accommodate 30 channels with 2 and 1 kc./s. pulse repetition frequency respectively. One of the subranges, in this example the fifth subrange, with the largest band-width, is used in connection with asynchronous time-division. The samples or signals transmitted in this range are each equipped with channel identification marks, as suggested in the above-mentioned patent. We may assume that in the given example there are 300 to 400 input-channels with an average band-width of 3 to 4 kc./s. of which in the average only one quarter is transmitting information, whereas three quarters are idle at least over an interval of 10 ms. These are conditions frequently met in telephonic communication combined with channels carrying music.

Continuing with this example, we have to observe separately for each input channel at the transmitting terminal the complexity of the source over an interval of for example 10 ms. We understand by complexity of the source the maximum information flux during this short interval. For practical purposes, particularly in connection with the present invention, we may also use as a measure of this "short-time complexity" the highest frequency component contained in the waveform during this short period. We have also to provide for means to delay the input wave form for at least this period.

Whenever a channel becomes busy again after an idle interval, automatic switching means have, at the end of the said short period (10 ms.), to search for an empty transmission channel with a band-width close to but higher than the highest frequency component in this given time interval and then have to connect the input channel to such a convenient transmission channel.

At the same time the receiver has to be informed over which transmission channel a particular output channel being in conversation with a given input channel has to expect his information. This can preferably be done over one of the subranges, particularly over the one operating in asynchronous time-division, by communicating the designation (number) of the concerned output channel in the form of said channel identification mark and the designation (number of the subrange and number of the channel line within the subrange) of the instantaneously allotted transmission channel in coded form by $n$-ary, preferably binary digits.

This established communication can be maintained over any length of time as long as the highest frequency component contained in the input waveform over any of said short periods (10 ms.) remains close to the band width of the transmission channel used for this communication. Whenever this highest frequency component becomes considerably higher or lower, the input channel and the output channel have to be switched synchronously at transmitter and receiver to a more suitable or economical transmission channel.

It is evident that the present invention, described in connection with the above example, which demonstrates only one of the many possible combination of subranges, modulation systems and multiplexing methods, offers a number of advantages compared with other redundancy reducing systems, as previously described (loc. cit.). Firstly, it does not require channel identification marks, except for communicating changes in the allotment of transmission channels. The additional waste of channel capacity for the transmission of the channel identification signals along with each signal is thus avoided. Secondly, it maintains synchronous sampling throughout any operating range. Thirdly, it is in a position to satisfy during each short time interval the Nyquist conditions of 2 WT samples, with T being the duration of the selected time interval and W being the highest frequency component within this interval. Fourthly, it allows at the receiving side the correct suppression of the sampling frequency by switching the correct low-pass filter into the demodulator along with the switching of the allotted transmission channel and fifthly it still suppresses the sampling process completely whenever a channel is idle and does not waste any channel capacity for a channel which temporarily does not carry information.

It is obvious that the method disclosed in the present invention is applicable to all sorts of information sources, when connected to a multichannel system of the type described. The optimum selection for the number and the transmission capacities of the subranges and the transmission channels, as well as the optimum selection for the observation and delay interval will depend entirely on the statistics of the information flux of the sources connected to the system.

The invention will now be described by way of example with reference to the accompanying drawings in which.

Figure 1:
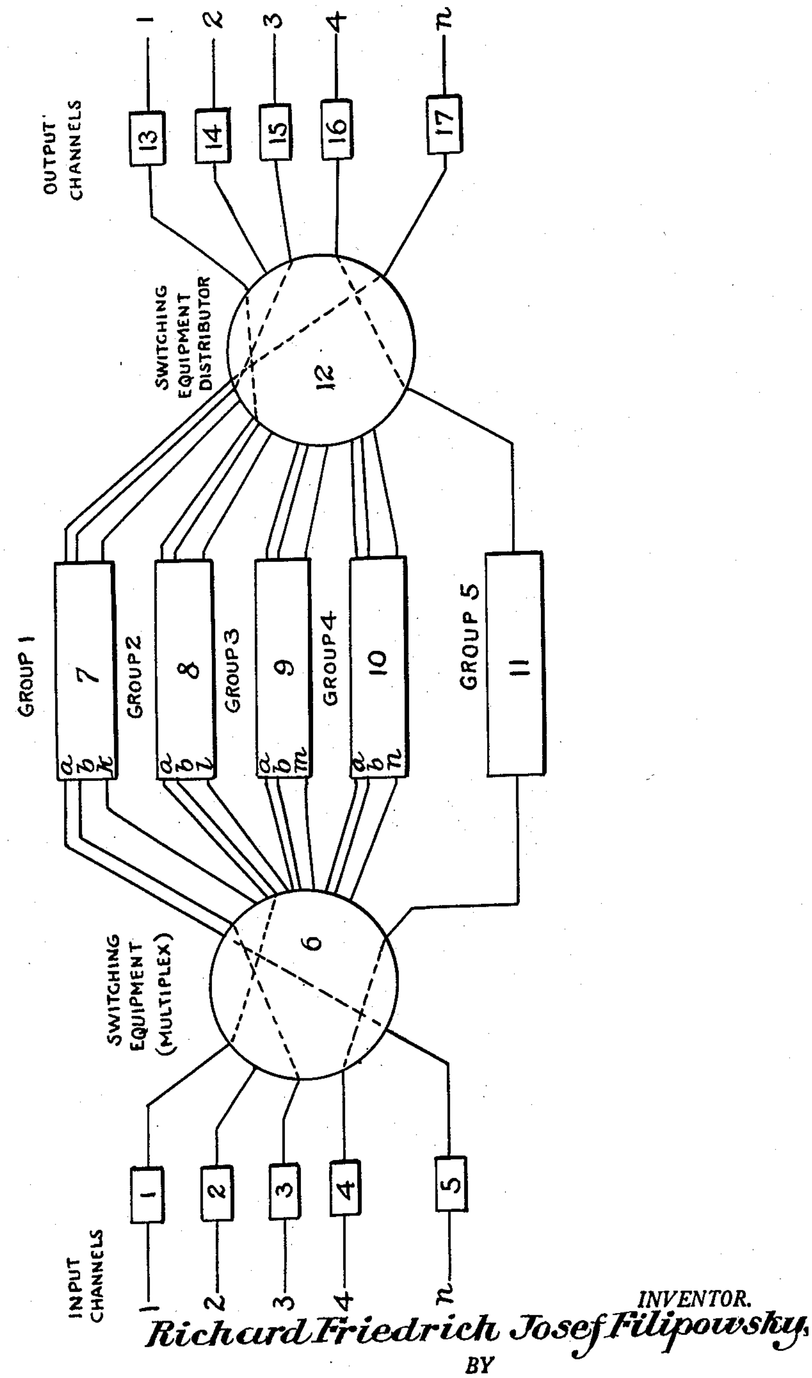
Fig. 1 is a block schematic of the system.

Referring to Fig. 1, there are $n$ channel inputs 1, 2, . . . 5 which have to be connected to $k+l+m+r+$ transmission channels 7, 8 . . . 11. In general there will be a larger number of input channels than transmission channels. The latter are arranged in 5 groups from group 1 to group 5 comprising channels 7, 8, 9, 10, 11. According to the invention only group 1 has a total transmission capacity equal to or larger than $k$ times the maximum information flux of a single input channel. Each channel of group 2 has only a fraction, for example exactly half the transmission capacity of each channel of group 1. The channels of group 3 have again less capacity than the channels of group 2 and those of group 4 have the smallest capacity of all transmission channels. Each of the groups of transmission channels 7, 8, 9, 10 comprises a complete synchronous pulse transmission system, involving pulse-modulator, time-division multiplexer, radio or line transmission equipment including carrier modulator and demodulator and channel distributor with pulse demodulator. Such pulse transmission systems are well known as for example U.S. Patent 2,272,070 granted February 3, 1942, to A. H. Reeves entitled Electric Signaling System. If the various groups are arranged in time-division it will be essential to select the pulse repetition rates as integer multiples of the lowest rate represented by group 4. A separate timer has to secure in this case accurate phasing of the pulses of the various groups.

According to the invention, the channels of the fifth group operate in asynchronous time division and carry primarily the service signals which have to indicate to the receiver any change in the interconnection between input channels and transmission channels. These service signals are transmitted over this asynchronous group with top priority. In addition to these service signals there may be any number of further channels using this asynchronous group in exactly the same manner as described in U.S. Patent 2,676,202, leaving first priority to said service channels and distributing the remaining channel capacity in accordance with the system described in said patent.

According to another feature of this invention said service signals may also be transmitted at regular intervals over one of the synchronous channels for the purpose of checking whether the actual interconnection between input channels and transmission channels corresponds correctly to the actual interconnection between transmission channels and output channels.

The connections between input channels and transmission channels are provided by the multiplexing equipment 6 at the transmitting side. The channel distributing equipment 12 provides in exact synchronism the analogous connections between transmission channels 7, 8 . . . 11 and output channels 13, 14 . . . 17 at the receiving side. According to the invention the switching equipment (multiplexing equipment) 6 at the transmitting side will permanently determine the required channel capacity for each input channel during each of said short time intervals (for example 10 ms.) and will accordingly establish the most economical distribution of the overall transmission capacity to all the active channels. Frequent switching operations are required to maintain a good transmission efficiency and exact synchronism of the multiplexer 6 with the channel distributor 12 has to be enforced.

Figure 2:
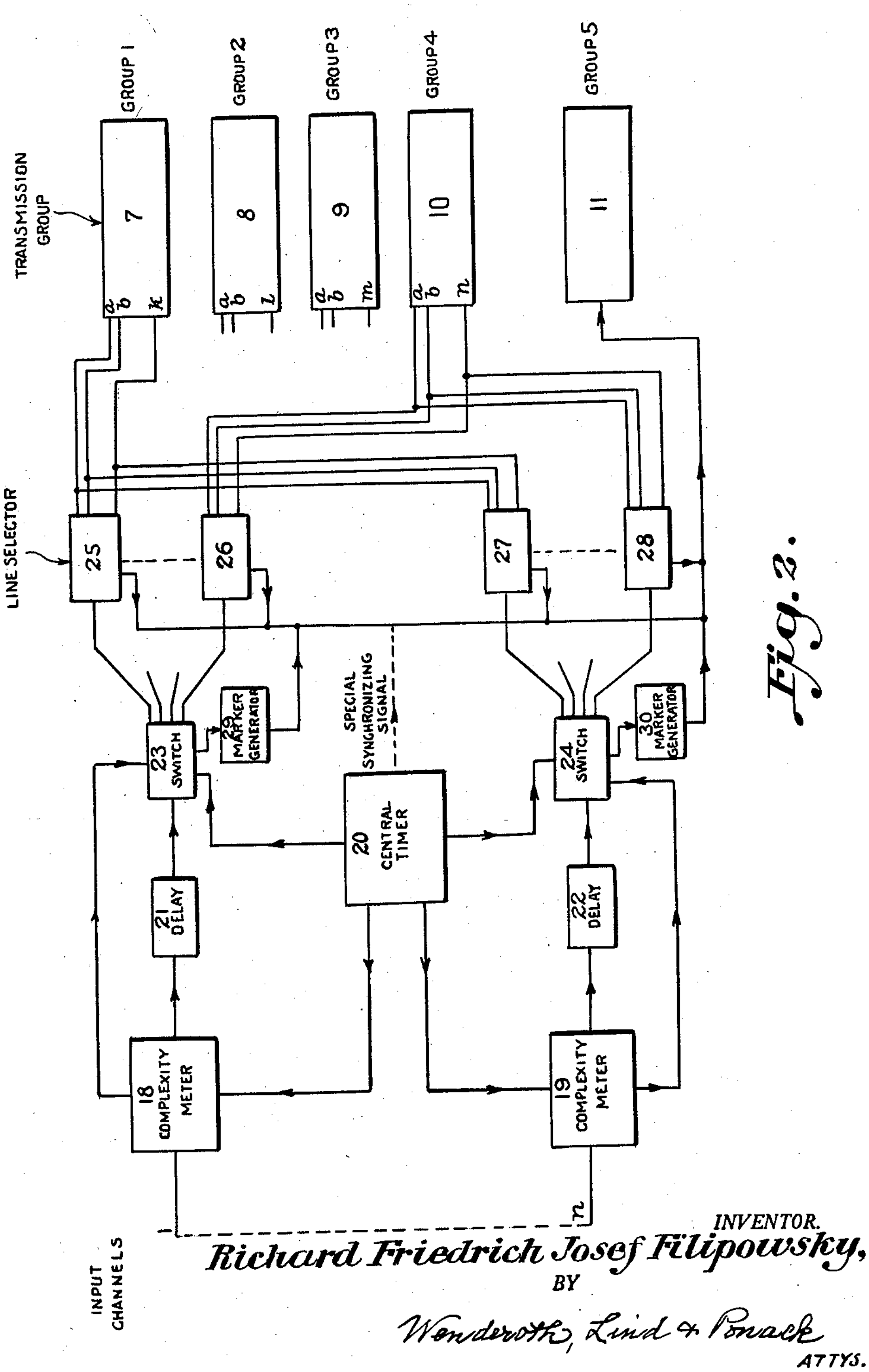
Fig. 2 is a block schematic of the multiplexing equipment at the transmitting side.

Referring to Fig. 2, this is one example for the many possible arrangements of a multiplexer (6, Fig. 1). In this particular embodiment there are separate complexity meters 18, 19 for each of the input channels Nos. 1 to $n$. Their purpose is to determine the required transmission capacity during each short time interval. In other words, they have to evaluate the highest frequency component of the input wave form during these short time intervals. Many methods are known for designing such complexity meters. (See U.S. Patent No. 2,676,202), but most of them supply an output voltage, which is in general proportional to the instantaneous complexity (highest frequency component) of the input waveform.

A central timer indicates to the complexity meters the length and phase of said short time intervals. A further object of the central timer is the triggering of the switches 23 . . . 24 at the correct instants, whenever switching to another transmission channel is required by the complexity meters. These switching instants may preferably be staggered over the length of said short time interval, when proceeding from channel 1 to $n$, to avoid any collision of said service signals within band 11, in the case when two or more of the input channels require simultaneously the switching operation.

The delay networks 21 . . . 22 serve to delay the waveforms during a time interval slightly larger than the length of said short intervals, permitting the occurrence of the switching action before any part of the waveform with high complexity could suffer distortions, when transmitted over a channel with too low capacity.

The switches 23 . . . 24 have to perform a multiple action: They firstly have to connect the input waveforms from the delay networks 21 . . . 29 to one of the four electronic line selectors 25 . . . 26 . . . 27 . . . 28, which connect to channels with a capacity corresponding to the complexity indicated by the complexity meters 18 . . . 19. Secondly, whenever the complexity meter requires a different channel capacity, they have to give an advance signal to the correct line selector, which in turn will select a free transmission channel within his group of channels. Thirdly the switches have to trigger a marker generator 29 . . . 30, which in turn sends a marker signal to the service channel 11 indicating the input channel to be switched. During the time required for the generation of said marker signal the line selector has to select a free channel and to send immediately after the marker signal a further signal (line signal) to transmission band 11 for communicating the number of the transmission channel to which the input will be switched immediately thereafter. Fourthly, the switches have to perform the change of connections at the correct instant determined by the central timer after all information about the next interconnection has been communicated to the receiver. The central timer at the receiver will then initiate the analogous switching action at the correct instant.

Figure 3:
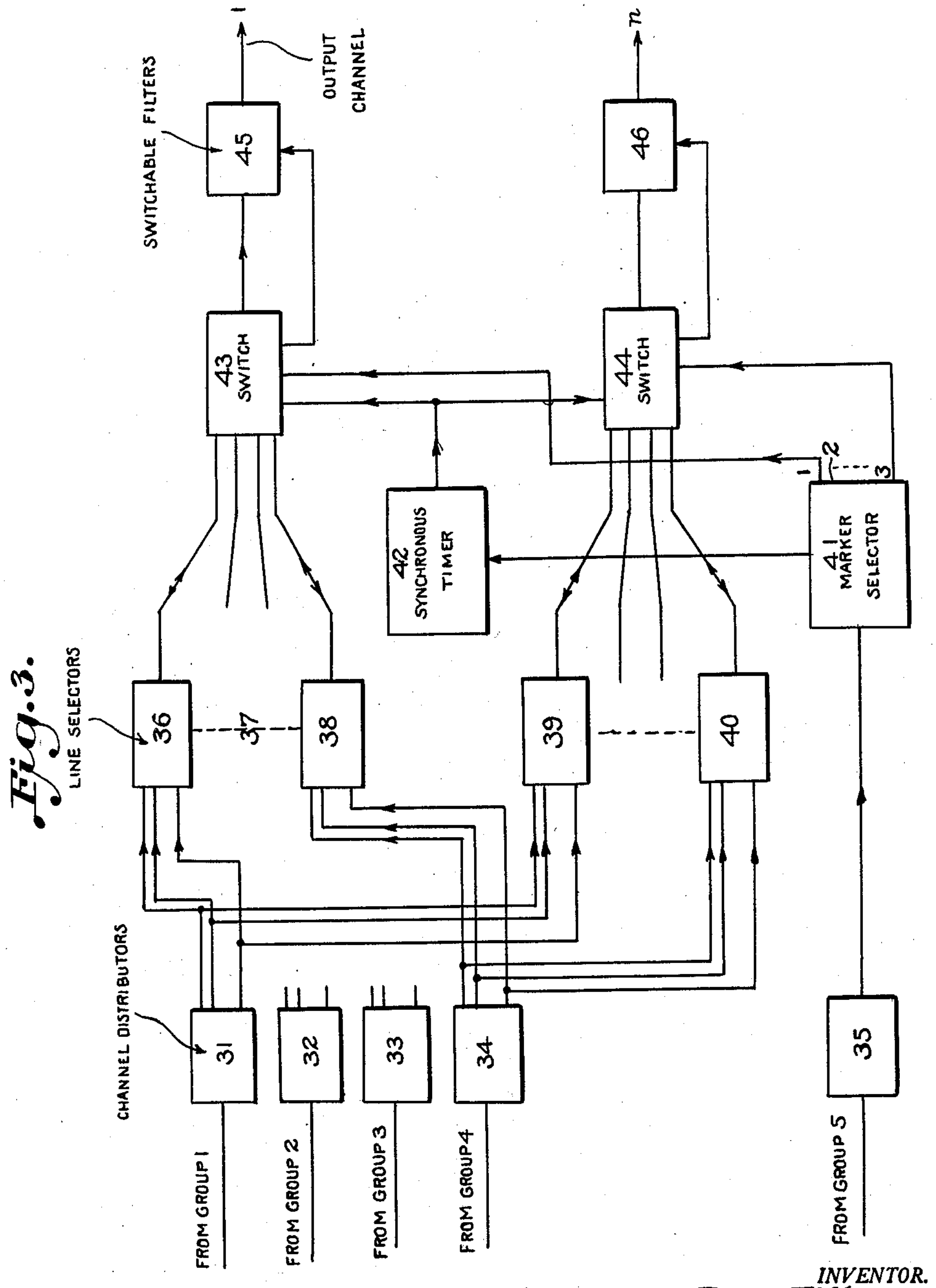
Fig. 3 is a block schematic of the channel distributing equipment at the receiving side.

Electronic switches of the required type performing such multiple actions are well known in computor techniques, in electronic telephone exchanges and in some time division multichannel systems:

Referring now to Figure 3, this is a block schematic drawing of the channel distributor at the receiving side. The installation receives the five channel groups over separate connections from any type of radio receiver or line output equipment. The channel separators (channel distributors) 31, 32 . . . 35 provide separate outputs for each transmission channel. It is the object of the rest of the installation to connect each busy transmission channel to the correct output channel and to change such connections at the correct instants whenever the multiplexing equipment at the transmitting side performs such changes. As previously explained, service signals are transmitted over band 5, carrying first a marker signal to designate the output channel to be switched and carrying immediately thereafter a line signal designating the transmission channel to which the concerned input channel will be switched next. The marker signal is read by the marker selector 41 and the immediately following line-signal is accordingly switched to the selector switch 43 . . . 44 of the corresponding ouput channel. Said selector switch reads the line-signal and prepares the change of connection to the new transmission channel by selecting accordingly the correct group 31, 32, 33, 34 and line inside the group with the aid of the line selectors 36, 37 . . . 38 . . . 39 . . . 40. These selector switches and line selectors are very similar to those at the transmitting side A synchronous timer 42 triggers the selector switches at exactly the right instant for switching over to the new transmission channel. This timer is kept in synchronism with the central timer 20 at the transmitting side by either special synchronisation signals or by reference to the marker signals themselves.

The selector switches 43 . . . 44 are finally followed by smoothing low-pass filters 45 . . . 46, with switchable cutoff frequency. The latter is changed by trigger pulses from the corresponding selector switch in accordance with the choice of channel group (transmission capacity) in such a way that it is always slightly higher than the highest transmissable frequency component.

It is evident that any pulse modulation system may be chosen for the transmission of the information within any one of the channel groups or channels during one of said short time intervals. The various groups of channels may either be multiplexed in time-division or in frequency-division.

According to one more feature of this invention it is highly economical to transmit the information in some, most or all of the transmission channels in differential form. Such communication systems are well known under the name of "prediction systems" and their application to the present invention is particularly useful, as prediction systems have a much smaller information flux than direct transmission systems, thus gaining full advantage of the high transmission economy offered by the present invention. Storage devices have to be used on both ends of the transmission channel in this case and differential circuits generate the "error signals" at the sending end. In the special case of "previous sample prediction" these error signals represent the difference of the value of the input waveform from sample to sample. Combination circuits at the receiving end have to form the algebraic sum of previous sample value plus error signal at the receiving side to arrive at the new sample value, which in turn has to be stored until arrival of the next error signal.

According to another feature of the invention it is possible to use a "priority circuit" in connection with the multiplexing equipment (6 in Fig. 1). Such a "priority circuit," also known as automatic auction circuit, has been described in U.S. Patent 2,676,202 and an improved version is fully detailed in a copending patent application "Automatic Auction Circuit." Its object in connection with the present invention is, to establish a well defined priority scheme for the connections of input channels to the transmission channels, as soon as all demands for transmission capacity can not be satisfied. During busy hours it may happen that most or all of the input channels are simultaneously active. It is then highly probable that more input channels require transmission channels of highest capacity, as such ones are available in the respective group (7 in Fig. 1). In the normal embodiment of the present invention as represented by Fig. 2 the line selector 25 or 27 would not be able to find a free channel of group 7 and the demand for a change of connection could not be satisfied by the switch 23. But it may be well the case, that some of the input-channels already connected to this group with highest capacity might actually have a much smaller complexity than the input channel demanding this connection unsuccessfully. Applying the automatic auction circuit will allow a continuous checking of the instantaneous complexity of all input-channels demanding access to this top transmission group. This priority circuit would further compare the complexity of all the concerned channels and it would secure connections only for the channels with highest complexity and eliminate those with smallest complexity regardless of the history of their interconnections.

It is thought that the invention and its advantages will be understood from the foregoing description and it is apparent that various changes may be made in the system without departing from the spirit and scope of the invention or sacrificing its material advantages, the system hereinbefore described being merely a preferred embodiment of the invention.

I claim:

1. In an electric multichannel pulse communication system having input and output channels, wherein the total transmission range is subdivided into subranges, which share the transmission medium in frequency division, wherein each of said subranges can accommodate a number of channels in time division, wherein the transmission capacity of all channels operating in the same subrange is the same, but is different from channels in at least one other subrange, wherein at least one of the subranges is operating in synchronous time division and wherein at least one other subrange is operating in asynchronous time division wherein to each sample of any channel operating in this asynchronous subrange there is allotted a channel mark along with the modulated pulse for identifying individual samples, the combination comprising means to generate electrical pulses, means to modulate said pulses individually in a pulse modulation system with the message signal arriving at each input terminal, means to arrange the pulses in frequency division, means to measure the complexity of each of said waveforms during a short time interval, means to delay the input waveforms over a time equal to said time interval, means to switch any of the input channels to a channel in a subrange the channels of which have a transmission capacity closest to the transmission capacity required by the respective input channel during said short time interval, a receiver, means to indicate to the receiver the instantaneous connection of a given input channel to a given transmission channel, means to generate said channel mark signals, means to transmit the multiplexed signal over a given transmission medium, means to receive the multiplexed signal and redistribute the subchannels and individual transmission channels to their correct output channel and means to demodulate the information individually for each channel.

2. In an electric multichannel pulse communication system as claimed in claim 1, wherein at least one of said subranges operating in asynchronous time division will be used to communicate at convenient but irregular intervals to each output channel the instantaneous allocation of a particular transmission channel comprising means to generate and transmit signals for designating both the output channel and the transmission channel, means to detect this signal at the receiver and means to switch any output channel to the corresponding transmission channel, whenever their actual interconnection might not correspond to the transmitted designating signals.

3. In an electric pulse communication system as claimed in claim 1 wherein said complexity measuring devices produce for each input channel a voltage indicating the instantaneous complexity of this channel, and wherein said switching means for connecting an input channel to the most economical transmission channel comprises an electronic circuit forming the difference of said complexity indicating voltage of each channel with a standard voltage corresponding to the maximum complexity which can be handled by the channel capacity of the transmission channel to which the respective input channel is connected, said switching means changing connections of any input channel to another transmission channel in such a sequence, that always the input channel with the largest of said voltage differences will receive its change of connection first.

4. In an electric pulse communication system as claimed in claim 1, wherein said demodulating means comprises a low-pass filter of the receiver demodulator in certain of the output channels, said filter having a variable cut-off frequency which is changed automatically so that it is always only slightly higher than the bandwidth of the instantaneously used transmission channel, and comprising switching means, which switch said cut-off frequency synchronously with said switching operation of the transmission channel.

5. In an electric pulse communication system as claimed in claim 2 wherein in one or several of said subranges the information is transmitted in differential form wherein any sample transmits merely the difference of the instantaneous value of the input waveform of a given channel against the value of the input waveform of the same channel at the previous sampling instant, comprising means to store any sample at the receiving side until the arrival of the next sample, means to store a replica of any sample at the transmitting side until the next sample is formed, means to form the difference between any two successive samples of a given channel and means to alter the value of said stored sample in accordance with said transmitted difference value.

6. In an electric pulse communication system as claimed in claim 2 wherein said complexity measuring devices produce for each input channel a voltage indicating the instantaneous complexity of this channel, and wherein said switching means for connecting an input channel to the most economical transmission channel comprises an electronic circuit forming the difference of said complexity indicating voltage of each channel with a standard voltage corresponding to the maximum complexity which can be handled by the channel capacity of the transmission channel to which the respective input channel is connected, said switching means changing connections of any input channel to another transmission channel in such a sequence, that always the input channel with the largest of said voltage differences will receive its change of connection first.

7. In an electric pulse communication system as claimed in claim 2, wherein said demodulating means comprises a low-pass filter of the receiver demodulator in certain of the output channels, said filter having a variable cut-off frequency which is changed automatically so that it is always only slightly higher than the bandwidth of the instantaneously used transmission channel, and comprising switching means, which switch said cut-off frequency synchronously with said switching operation of the transmission channel.

8. In an electric pulse communication system as claimed in claim 3, wherein said demodulating means comprises a low-pass filter of the receiver demodulator in certain of the output channels, said filter having a variable cut-off frequency which is changed automatically so that it is always only slightly higher than the bandwidth of the instantaneously used transmission channel, and comprising switching means, which switch said cut-off frequency synchronously with said switching operation of the transmission channel.

9. In an electric multichannel pulse communication system, wherein the total transmission range is subdivided into subranges, which share the transmission medium in time-division wherein each of said subranges can accommodate a number of channels in time division, wherein the transmission capacity of all channels operating in the same subrange is the same, but is different from channels in at least one other subrange, wherein at least one of the subranges is operating in synchronous time division and wherein at least one other subrange is operating in asynchronous time division wherein to each sample of any channel operating in this asynchronous subrange there is allotted a channel mark along with the modulated pulse for identifying individual samples, the combination comprising means to generate electrical pulses, means to modulate said pulses individually in a pulse modulation system with the message signal arriving at each input terminal from external communication channels, means to arrange the pulses in time division, means to measure the complexity of each of said waveforms during a short time interval, means to delay the input waveforms over a time equal to said time interval, means to switch any of the input channels to a channel in a subrange the channels of which have a transmission capacity closest to the transmission capacity required by the respective input channel during said short time interval, a receiver, means to indicate to the receiver the instantaneous connection of a given input channel to a given transmission channel, means to generate said channel marker signals, means to transmit the multiplexed signal over a given transmission medium, means to receive the multiplexed signal and redistribute the subchannels and individual transmission channels to their correct output channel and means to demodulate the information individually for each channel.

References Cited in the file of this patent

UNITED STATES PATENTS

| | | |
|---|---|---|
| 2,098,956 | Dudley | Nov. 16, 1937 |
| 2,271,000 | Lovell | Jan. 27, 1942 |
| 2,272,070 | Reeves | Feb. 3, 1942 |
| 2,388,001 | Loughren | Oct. 30, 1945 |
| 2,541,932 | Melhose | Feb. 13, 1951 |
| 2,559,644 | Landon | July 10, 1951 |
| 2,664,462 | Bedford et al. | Dec. 29, 1953 |
| 2,676,202 | Filipowsky | Apr. 20, 1954 |
| 2,803,702 | Ville et al. | Aug. 20, 1957 |
| 2,810,787 | Di Toro et al. | Oct. 22, 1957 |